United States Patent Office 3,383,410
Patented May 14, 1968

3,383,410
PROCESS FOR THE PREPARATION OF TETRA-ALKYLAMMONIUM SALTS OF BENZENE SULFONIC ACIDS
Robert Johnson and Le Moyne W. Plischke, Pensacola, Fla., assignors to Monsanto Company, a corporation of Delaware
No Drawing. Filed Feb. 26, 1964, Ser. No. 347,362
10 Claims. (Cl. 260—501.21)

The present invention relates to a process for the manufacture of quaternary alkyl ammonium salts of certain benzenoid sulfonic acids, and more particularly, to a process for the manufacture of quaternary alkyl ammonium salts of benzenoid hydrocarbon sulfonic acids in aqueous solution.

Quaternary alkyl ammonium sulfonates constitute a class of compounds which are generally water soluble crystalline solids. These salts are useful for a variety of industrial and agricultural purposes, e.g., as dispersants in the dyeing and processing textile industry, generally, as biological toxicants, and as bactericides and viricides. They also may be employed advantageously in aqueous solution for electrolytic processes involving organic compounds having limited water solubility.

Processes are known for the preparation of tetra-alkylammonium salts of benzenoid hydrocarbon sulfonic acids wherein an alkyl ester of a benzenoid hydrocarbon sulfonic acid is reacted with a trialkylamine; however, these known processes are carried out under anhydrous conditions in the presence of an inert organic solvent. Further, when attempts are made to prepare tetra-alkylammonium benzenoid hydrocarbon sulfonates from alkyl benzenoid sulfonates and trialkylamines by these known anhydrous procedures, many difficulties are encountered. The reaction rates are low; and 5 to 10 percent by weight of the ester generally remains unreacted in the organic solvent, even though a large excess of amine may be present in the reaction mass. The organic solvents also have a low solubility for tetra-alkylammonium salts, causing crystallization thereof in reaction apparatus. Such crystallization introduces process difficulties, such as line plugging and crystal build-up on cooling surfaces.

In electrolytic processes for synthesizing certain organic compounds wherein aqueous electrolytes are used, quaternary alkyl ammonium sulfonates are employed to increase the solubility of organic compounds in the aqueous electrolyte. When tetra-alkylammonium salts of benzenoid hydrocarbon sulfonic acids are prepared by known non-aqueous procedures for use with the aqueous electrolytes, the salts must first be recovered from the non-aqueous solutions by crystallization, filtration, or the like and then must be further treated to obtain salts of high purity necessary for use in preparation of proper aqueous electrolytes. These recovery and purification steps are not only cumbersome and time consuming, but also expensive and loss producing.

Although it is well known that alkylamines are water soluble, the successful preparation of tetra-alkylammonium salts of benzenoid hydrocarbon sulfonic acids directly in aqueous solution, in substantially theoretical yields, was completely unsuspected. It is well known that water hydrolyzes alkyl esters of benzenoid hydrocarbon sulfonic acids. Therefore, water is normally excluded from any reaction involving these compounds.

It is a primary object of this invention to provide a process for preparing tetra-alkylammonium salts of benzenoid sulfonic acids in aqueous solution.

It is also an object of this invention to provide a process for preparing tetra-alkylammonium salts of benzenoid hydrocarbon sulfonic acids in substantially theoretical yields.

A further object is to provide a process for synthesizing tetra-alkylammonium benzenoid hydrocarbon sulfonates in aqueous solutions that can be used directly as electrolytes for electrolytic processes for synthesizing certain organic compounds.

Generally, the above stated objects are achieved in the provision of a procedure wherein a selected alkyl benzenoid hydrocarbon is contacted in aqueous medium with a selected trialkylamine. In this procedure the trialkylamine is present in a molar excess of at least 5 percent. The general reaction of this invention is shown next below:

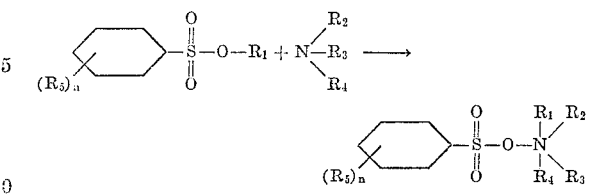

wherein $R_1$, $R_2$, $R_3$, and $R_4$ are selected from the group consisting of alkyl radicals having from 1 to 5 carbon atoms, $R_5$ is selected from the group consisting of hydrogen and alkyl radicals having from 1 to 5 carbon atoms, $n$ is a number from 1 to 4, and the total number of carbon atoms in the $(R_5)_n$ alkyl radicals is from 1 to 20. After the reaction has gone to completion the resulting solution is subjected to vaporizing conditions to remove any excess trialkylamine.

Examples of the tetra-alkylammonium sulfonates which may be prepared in accordance with the process of this invention are tetramethylammonium o-, m- or p-toluenesulfonate which may be prepared by the reaction of trimethylamine with methyl o-, m- or p-toluenesulfonate; tetramethylammonium benzenesulfonate which may be prepared by the reaction of trimethylamine with methyl benzenesulfonate; tetramethylammonium o-, m- or p-cumensulfonate which may be prepared by the reaction of trimethylamine with methyl o-, m- or p-cumensulfonate; tetramethylammonium o-, m- or p-butylbenzenesulfonate which may be prepared by the reaction of trimethylamine with methyl o-, m- or p-butylbenzenesulfonate; tetramethylammonium o-, m- or p-tert-amylbenzenesulfonate which may be prepared by the reaction of trimethylamine with methyl o-, m- or p-tert-amylbenzenesulfonate; tetramethylammonium o-xylenesulfonate which may be prepared by the reaction of trimethylamine with methyl o-xylenesulfonate; tetramethylammonium p-xylenesulfonate which may be prepared by the reaction of trimethylamine with methyl p-xylenesulfonate; tetramethylammonium m-xylenesulfonate which may be prepared by the reaction of trimethylamine with methyl m-xylenesulfonate; tetramethylammonium mesitylenesulfonate which may be prepared by the reaction of trimethylamine with methyl mesitylenesulfonate; tetramethylammonium durenesulfonate which may be prepared by the reaction of trimethylamine with methyl durenesulfonate; tetramethylammonium o-dipropylbenzenesulfonate which may be prepared by the reaction of trimethylamine with methyl o-dipropylbenzenesulfonate; methyl triethylammonium o-, m- or p-toluenesulfonate which may be prepared by the reaction of triethylamine with methyl o-, m- or p-toluenesulfonate; methyl triethylammonium benzenesulfonate which may be prepared by the reaction of triethylamine with methyl benzenesulfonate; methyl triethylammonium o-, m- or p-ethylbenzenesulfonate which may be prepared by the reaction of triethylamine with methyl o-, m- or p-ethylbenzenesulfonate; methyl triethylammonium o-, m- or p-cumenesulfonate which may be prepared by the reaction of triethylamine with methyl o-, m- or p-cumenesulfonate; methyl triethylammonium o-, m- or p-butylbenzenesulfonate which may be prepared by the reaction of triethylamine with methyl o-, m- or p-butylbenzenesulfonate; methyl triethylammonium o-, m- or p-tert-amylbenzenesulfonate which may be prepared by the reaction of triethylamine with methyl o-, m- or p-tert-amylbenzenesulfonate; methyl triethylammonium o-xylenesulfonate which may be prepared by the reaction of triethylamine with methyl o-xylenesulfonate; methyl triethylammonium m-xylenesulfonate which may be prepared by the reaction of triethylamine with methyl m-xylenesulfonate; methyl triethylammonium mesitylenesulfonate which may be prepared by the reaction of triethylamine with methyl mesitylenesulfonic; methyl triethylammonium durenesulfonate which may be prepared by the reaction of triethylamine with methyl durenesulfonate; methyl triethylammonium o-dipropylbenzenesulfonate which may be prepared by the reaction of triethylamine with methyl o-dipropylbenzenesulfonate; and many other compounds including mixed alkyl quaternary ammonium sulfonates which may be prepared by the reaction of trialkylamines having one or more alkyl radicals different from the methyl alkyl radical of the alkyl benzenoid hydrocarbon sulfonate ester reacted therewith.

In the process for preparing a desired tetra-alkylammonium benzenoid hydrocarbon sulfonate from the selected trialkylamine and alkyl ester of the benzenoid hydrocarbon sulfonic acid, reaction may be effected by contacting the ester with an aqueous solution of trialkylamine at ambient, decreased or increased temperatures until chemical addition of the sulfonate to the amine is substantially complete. No inert organic solvent, such as ethanol, isopropanol benzene, dichlorobenzene, hexane, dioxane, or ether is necessary. The alkyl benzenoid hydrocarbon sulfonate may be added to aqueous trialkylamine solution with aggitation and at a rate and under conditions of temperature and pressure so that the vapor pressure of the system does not become excessive. The amount of trialkylamine in the aqueous solution should be greater than the amount theoretically required for reaction. It is preferred that at least a 5 percent molar excess of amine be provided. The reaction proceeds very rapidly and is substantially complete when the addition of the ester to the aqueous solution of amine ceases. Reaction temperature is governed by the trialkylamine. The reaction is generally exothermic. At excessive temperatures alkylamine vaporization takes place; therefore, cooling means or pressurizing equipment must be provided. As an example, trimethylamines would react at 0° C., but it would be necessary to provide expensive refrigeration equipment. At 100° C. employing trimethylamines pressurizing equipment would be necessary to prevent the vaporization of the reacting substances. Temperatures at or near ambient in the case of trimethylamines are acceptable. Triethylamines usually require the application of heat to initiate reaction and in some cases an elevated temperature is sustained.

In a preferred example, a variation of the temperature of the aqueous solution of amine between 20° C. and 60° C. will have little or no effect on the yield of tetramethylammonium benzenesulfonate prepared by the addition of methyl benzenesulfonate to an aqueous solution containing a 10 percent theoretical excess of trimethylamine. In a second example, the production of tetraethylammonium p-toluenesulfonate from triethylamine and ethyl-p-toluenesulfonate, a reaction temperature from 70 to 90° C. is acceptable.

Following the addition of the ester to the aqueous solution, excess amine is volatilized from the solution and recovered for reuse by absorption in water or other suitable means. The concentration of the residual aqueous solution of quaternary alkyl ammonium benzenoid sulfonate may be adjusted as required, depending upon the particular application or process wherein the aqueous solution may be used. There is some phase formation when triethylamine is reacted with a sulfonate having as its reactive alkyl radical the ethyl group. In the case wherein the reactive alkyl group is methyl, the reaction is so swift that there is no discernible phase formation. When heat is applied to a solution having phases therein, the phases tend to disappear as the reaction proceeds.

In a preferred example of the use of the aqueous quaternary alkyl ammonium salt solution as a solvent and electrolyte in the electrohydrodimerization of acrylonitrile to adiponitrile, a 70 percent by weight salt solution prepared in accordance with the process of this invention may be used directly without further purification or treatment. A 70 percent by weight salt solution is approximately the level needed for the electrohydrodimerization process. At low water levels the reaction of this invention would still take place. However, for the reaction to proceed effectively there must be enough water present for the formation of a saturated or less than saturated solution. At the other extreme, too much water causes the production of impurities. As stated before, alkyl benzenoid sulfonates hydrolyze. To illustrate,

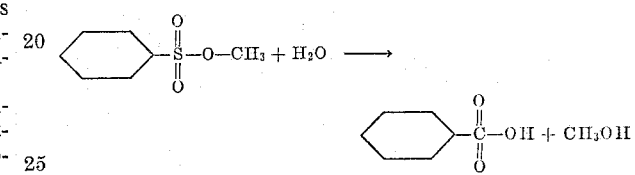

and when an amine, such as $$\text{N} \begin{array}{c} \diagup CH_3 \\ - CH_3 \\ \diagdown CH_3 \end{array}$$

is present then the following reaction takes place:

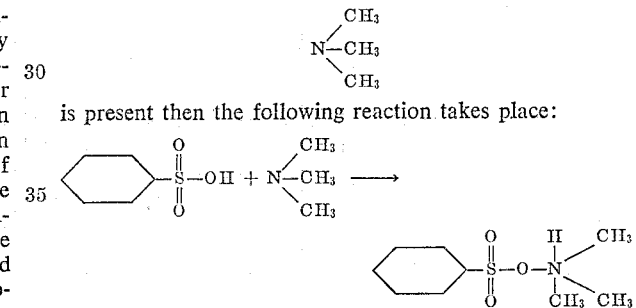

As the water level increases, the above reaction takes place to an undesirable degree. Although the concentration of the trialkylamine in aqueous solution has no definite limits, the concentration is dependent upon the impurity level acceptable in the final reaction product and upon the amount of salt desired in the product solution. However, a preferred concentration of trialkylamine in water is 20–50 percent by weight of solution.

The process of this invention is applicable to either a continuous or batch operation. For a continuous process, amine and water may be contacted in an absorber and the resulting aqueous amine solution contacted with a selected ester in a reactor for the product of the salt. The salt product is then fed to an evaporator for the removal of excess amine for recycle to the amine absorber. Modifications of the continuous process such as the continuous removal and recycle of amine in a reaction apparatus can be made. The invention is further illustrated by, but not limited to the following examples:

Example I

A 29.6 percent aqueous solution of trimethylamine was prepared by adding 325 grams (5.50 mols) of trimethylamine to 771 grams of water. To this aquous amine solution, 861 grams (5.0 mols) of methyl benzenesulfonate was added with constant stirring over a 3.3 hour period. The aqueous amine solution provided a 10 percent molar excess of trimethylamine. During the addition of the methyl benzenesulfonate to the aqueous amine solution, the temperature of the amine solution was maintained at 20 C. by means of an ice bath.

Following the addition of the methyl benzenesulfonate, the resulting aqueous solution was heated at a reflux temperature of approximately 107 C. to drive off excess or unreactant amine. The residual salt solution contained 1156 grams of tetramethylammonium benzenesulfonate corresponding to a concentration of 58.7 percent and a reaction yield of 99.8 percent. Only 0.08 percent trimethylammonium benzenesulfonate, as measured on a dry basis, was present in the product as an impurity.

A sample of the tetramethylammonium benzenesulfonate thus prepared was recovered from the aqueous solution by evaporation of the water under reduced pressure in a flash evaporator. This sample of the salt was found to have a melting point between 209.0° C. to 210.2° C., as compared with 212° C. to 213° C. for a standard specimen of tetramethylammonium benzenesulfonate.

Example II

An aqueous solution having 29.6 percent trimethylamine concentration was prepared as in Example I above, and to this solution 861 grams (5.0 mols) of methyl benzenesulfonate was added with constant stirring over a period of 1.1 hours. The aqueous amine solution provided a 10 percent molar excess of trimethylamine. The temperature of the solution was maintained at approximately 30° C. during the addition of the methyl benzenesulfonate to the aqueous amine solution. Following the addition of the methylbenzenesulfonate, the resulting solution was stirred for an additional 30 minutes and then heated at a reflux temperature of approximately 108° C. to drive off excess or unreacted amine. The residual aqueous salt solution was found to contain 1155 grams of tetramethylammonium benzenesulfonate corresponding to a concentration of 59.9 percent and a yield of 99.8 percent. The salt thus prepared contained 0.10 percent trimethylammonium benzenesulfonate measured on a dry basis.

Example III

An aqueous solution having a concentration of 37.9 percent triethylamine was prepared by adding 445 grams (4.40 mols) of 99.9 percent pure triethylamine to 729 grams of water. To this aqueous solution, 689 grams (4.00 mols) of methyl benzenesulfonate was added with constant stirring of the solution during a period of 20 minutes. The aqueous amine solution provided a 10 percent molar excess of triethylamine. The temperature of the aqueous solution was maintained at approximately 60° C. during the addition of the sulfonate, and the solution was stirred for 15 minutes following the completion of the sulfonate addition. Excess or unreacted triethylamine was removed from the resulting solution by distillation as an azeotrope with water, and then additional water was added to the remaining aqueous salt solution to replace that water which was removed during the distillation. The residual aqueous solution contained 1100 grams of methyl triethylammonium benzenesulfonate which corresponds to a 62.06 percent salt concentration, and a yield of 96.8 percent. The salt thus prepared contained 3.82 percent impurities calculated as triethylammonium benzenesulfonate measured on a dry basis.

Example IV

An aqueous solution having a concentration of 31.5 percent trimethylamine was prepared by the addition of 2254 grams (38.14 mols) of trimethylamine to 4907 grams of water. Methyl toluenesulfonate in an amount of 5587 grams (30.0 mols) was added to the prepared aqueous amine solution with constant stirring over a period of 45 minutes. The aqueous amine solution provided a 27.1 percent molar excess of trimethylamine. The temperature of the aqueous solution was maintained at approximately 20° C. during the addition of the methyl toluenesulfonate, and following the addition of the sulfonate, the resulting solution was heated at a reflux temperature of approximately 108° C. to drive off excess or unreacted trimethylamine. The residual aqueous solution contained 7284 grams of tetramethylammonium toluenesulfonate which corresponds to an aqueous solution concentration of 60.1 percent and a reaction yield of 98.8 percent. The tetramethylammonium toluenesulfonate salt contained 0.14 percent trimethylammonium toluenesulfonate impurity as measured on a dry basis.

Example V

An aqueous solution of trimethylamine having a concentration of approximately 30 percent was obtained by dissolving the trimethylamine gas in cold water. A series of experiments were performed wherein a measured excess of the trimethylamine aqueous solution was charged to a 300 millimeter reactor equipped with a magnetic stirrer, a solution covered thermocouple, and cooling coils. In each experiment, approximately 100 grams of methyl toluenesulfonate were added rapidly to the amine solution in the reactor over a period of 4–5 minutes while the solution within the reactor was stirred. The temperature of the solution within the reactor was controlled closely at a series of selected temperatures by controlling the flow of cooling water through the cooling coils. In each of the experiments, the chosen operating temperature for the experiment was maintained for a period of 15 minutes while stirring following the addition of ester, and then the solution within the reactor was cooled rapidly to 25° C. and analyzed. The results of 4 runs made in this manner are shown in Table 1 below wherein trimethylamine is abbreviated as TMA and trimethylammonium toluenesulfonate is abbreviated as impurity.

TABLE 1

| Run | Molar Excess TMA, Percent | Reaction Temp., ° C. | Reaction Pressure | Percent Impurity |
|---|---|---|---|---|
| 1 | 10 | 30 | Atmospheric | 0.03 |
| 2 | 10 | 40 | do | 0.03 |
| 3 | 20 | 30 | do | 0.03 |
| 4 | 20 | 40 | do | 0.04 |

As can be seen clearly from Table 1 above tetramethylammonium toluenesulfonate salt prepared at 30° C. and 40° C. with both a 10 and 20 percent excess of trimethylamine had substantially the same amounts of the impurity, trimethylammonium toluenesulfonate salt contained therein.

Example VI

Four (4) experiments, two (2) wherein methyl toluenesulfonate and two (2) wherein methyl benzenesulfonate were reacted with trimethylamine, were performed in accordance with the procedure and apparatus of Example V above except the reaction temperature was controlled at 60° C. and the autogenous pressure was 30 p.s.i.g. maximum. The results of these four (4) experiments are shown in Table 2 below. In runs 1 and 2 below the ester reacted with trimethylamine (TMA in Table 2) was methyl toluenesulfonate and the impurity measured was trimethylammonium toluenesulfonate. In runs 3 and 4 the ester reacted with TMA was methyl benzenesulfonate and the impurity measured was trimethylammonium benzenesulfonate.

TABLE 2

| Run | Molar Excess TMA, Percent | Reaction Temp., ° C. | Reaction Pressure, p.s.i.g. | Percent Impurity |
|---|---|---|---|---|
| 1 | 10 | 60 | 29 | 0.06 |
| 2 | 30 | 60 | 30 | 0.06 |
| 3 | 10 | 60 | 29 | 0.08 |
| 4 | 30 | 60 | 29 | 0.08 |

As can be seen clearly from Tables 1 and 2 increased pressure, increased temperature and increased excess of trimethylamine has substantially no effect on the purity of the tetramethylammonium toluenesulfonate and tetramethylammonium benzenesulfonate salts produced in accordance with the process of this invention. The salts had a purity in excess of 99.9 percent in all cases.

Example VII

An aqueous solution having a concentration of 34.5 percent triethylamine was prepared by the addition of 212 grams (2.09 mols) of triethylamine to 402 grams of water.

Ethyl p-toluenesulfonate in an amount of 393 grams (1.96 mols) was added to the prepared aqueous amine solution with constant stirring over a period of 20 minutes. The aqueous amine solution provided a 6.6 percent molar excess of triethylamine. The temperature of the aqueous solution was maintained at 25–28° C. during the addition of the ethyl p-toluenesulfonate. Upon completion of the addition of the ethyl p-toluenesulfonate to the aqueous solution of triethylamine, the solution was heated for three (3) hours at 75–85° C. Initially, two phases were present. After (1) hour only one phase remained. Unreacted triethylamine was removed by distillation as an azeotrope with water. Water was then added to replace that lost by distillation. The residual aqueous solution had a concentration of 59.70 percent and contained 598.6 gm. of salt. Tetraethylammonium p-toluenesulfonate was obtained as an aqueous solution which contained 12.8 percent triethylammonium p-toluenesulfonate on a dry salt basis. Such a high level of impurities was possibly attributable to the insufficient excess of triethylamine.

The process for preparing aqueous solutions of quaternary ammonium salts as taught by this invention possesses a number of advantages. Reaction between a desired trialkylamine and a benzenoid hydrocarbon sulfonic alkyl ester proceeds at a reaction rate in aqueous solution which is much faster than any reaction rate obtained previously when the salts were prepared in organic solution. The yield of the desired salt is usually very high. The use of water as a reaction medium eliminates process difficulties, such as the crystallization of salt product from solution, which occur when known processes using organic solvents as the reaction medium are employed. Furthermore, the use of water permits the use of lower reaction temperatures. The high yield of reaction product makes purification, crystallization or recycle of the salt product unnecessary, and the improvement in the economics of the process of this invention are obvious by the elimination of such steps. The use of water in place of organic materials and the simple and inexpensive means for recovering excess amine which may be reused without further purification in accordance with the process of this invention are obvious process advantages. Further, aqueous quaternary alkyl ammonium benzenoid hydrocarbon sulfonate solutions prepared in accordance with the process of this invention may be used directly as aqueous electrolytes in organic electrochemical reactions without further purification or treatment.

As many widely different embodiments may be made without departing from the spirit and scope of this invention, it is to be understood that said invention is not to be restricted in any way except as set forth in the appended claims.

We claim:

1. A process for the production of tetra-alkylammonium salts of benzenoid hydrocarbon sulfonic acids having the general structure,

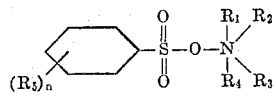

wherein $R_1$, $R_2$, $R_3$, and $R_4$ are selected from the group consisting of alkyl radicals having from 1 to 5 carbon atoms, $R_5$ is selected from the group consisting of hydrogen and alkyl radicals having from 1 to 5 carbon atoms, $n$ is a number from 1 to 4, and the total number of carbon atoms in the $(R_5)_n$ alkyl radicals is from 1 to 20, comprising the steps of:

(a) bringing an alkyl benzenoid hydrocarbon sulfonate into reacting contact with an aqueous solution having a molar excess of trialkylamine therein to produce an aqueous solution of the tetra-alkylammonium salt of a benzenoid hydrocarbon sulfonic acid; and (b) passing said aqueous salt solution to a zone having vaporizing conditions therein, thereby removing unreacted trialkylamine.

2. The process of claim 1 wherein the molar excess of trialkylamine is greater than 5 percent.

3. The process of claim 1 wherein the trialkylamine is trimethylamine.

4. The process of claim 1 wherein the trialkylamine is triethylamine.

5. The process of claim 1 wherein the tetra-alkylammonium salt of a benzenoid hydrocarbon sulfonic acid is tetramethylammonium toluenesulfonate.

6. The process of claim 1 wherein the tetra-alkylammonium salt of a benzenoid hydrocarbon sulfonic acid is tetramethylammonium benzenesulfonate.

7. The process of claim 1 wherein the tetra-alkylammonium salt of a benzenoid hydrocarbon sulfonic acid is methyl triethylammonium toluenesulfonate.

8. The process of claim 1 wherein the tetra-alkylammonium salt of a benzenoid hydrocarbon sulfonic acid is methyl triethylammonium benzenesulfonate.

9. The process of claim 1 wherein the tetra-alkylammonium salt of a benzenoid hydrocarbon sulfonic acid is methyl tripropylammonium benzenesulfonate.

10. A process for the production of tetra-alkylammonium salts of benzenoid hydrocarbon sulfonic acids having the general structure,

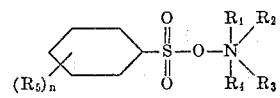

wherein $R_1$, $R_2$, $R_3$, and $R_4$ are selected from the group consisting of alkyl radicals having from 1 to 5 carbon atoms, $R_5$ is selected from the group consisting of hydrogen and alkyl radicals having from 1 to 5 carbon atoms, $n$ is a number from 1 to 4, and the total number of carbon atoms in the $(R_5)_n$ alkyl radicals is from 1 to 20, comprising the steps of:

(a) feeding an alkyl benzenoid hydrocarbon sulfonate into an aqueous solution having a molar excess of trialkylamine therein to produce an aqueous solution of the tetra-alkylammonium salt of a benzenoid hydrocarbon sulfonic acid; and (b) passing said aqueous salt solution to a zone having vaporizing conditions therein, thereby removing unreacted trialkylamine.

References Cited

FOREIGN PATENTS 1,328,327  4/1963  France.

OTHER REFERENCES

Streituraser: Chem. Reviews, vol. 56, No. 4 (August 1956), pp. 573–572. QD A563, pp. 573–5 and 601–9 relied on.

Houben-Weyl: Methoden der Organischen Chemie, vol. 11/2 (1958), 591–6. QD 258 H7.

Mairanovskii: Dakl. Abad. Nauk. S.S.S.R. 132, 1352–5 (1960). CA relied on vol. 56, col. 14973b (1962), QD A51.

LORRAINE A. WEINBERGER, *Primary Examiner.*

M. WEBSTER, *Assistant Examiner.*